United States Patent
Kesireddy

(10) Patent No.: US 8,374,872 B2
(45) Date of Patent: Feb. 12, 2013

(54) DYNAMIC UPDATE OF GRAMMAR FOR INTERACTIVE VOICE RESPONSE

(75) Inventor: Manohar R. Kesireddy, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 649 days.

(21) Appl. No.: 12/264,392

(22) Filed: Nov. 4, 2008

(65) Prior Publication Data

US 2010/0114564 A1 May 6, 2010

(51) Int. Cl.
*G10L 15/00* (2006.01)
*G10L 15/26* (2006.01)
*G10L 15/06* (2006.01)
*G10L 15/28* (2006.01)
*G10L 13/00* (2006.01)
*G10L 11/00* (2006.01)
*G10L 21/00* (2006.01)

(52) U.S. Cl. ........ 704/257; 704/235; 704/243; 704/231; 704/255; 704/258; 704/270; 704/270.1; 704/275

(58) Field of Classification Search .................. 704/257, 704/231, 270, 270.1, 275, 201, 235, 243, 704/255, 258
See application file for complete search history.

(56) References Cited

U.S. PATENT DOCUMENTS

| | | | | |
|---|---|---|---|---|
| 6,523,061 | B1 * | 2/2003 | Halverson et al. | 709/202 |
| 6,728,676 | B1 * | 4/2004 | Ortega | 704/270 |
| 7,620,549 | B2 * | 11/2009 | Di Cristo et al. | 704/257 |
| 7,720,684 | B2 * | 5/2010 | Huerta et al. | 704/257 |
| 7,835,913 | B2 * | 11/2010 | Aubauer | 704/275 |
| 7,920,682 | B2 * | 4/2011 | Byrne et al. | 379/88.18 |
| 2004/0044516 | A1 * | 3/2004 | Kennewick et al. | 704/5 |
| 2005/0102142 | A1 * | 5/2005 | Soufflet et al. | 704/246 |
| 2005/0203751 | A1 * | 9/2005 | Stevens et al. | 704/276 |
| 2005/0283764 | A1 * | 12/2005 | Chiu | 717/125 |
| 2006/0095267 | A1 * | 5/2006 | Yano et al. | 704/275 |
| 2006/0143007 | A1 * | 6/2006 | Koh et al. | 704/243 |
| 2006/0247913 | A1 * | 11/2006 | Huerta et al. | 704/1 |
| 2006/0247931 | A1 * | 11/2006 | Caskey et al. | 704/270 |
| 2007/0005372 | A1 * | 1/2007 | Huning et al. | 704/275 |
| 2007/0033037 | A1 * | 2/2007 | Mowatt et al. | 704/251 |
| 2007/0050191 | A1 * | 3/2007 | Weider et al. | 704/275 |
| 2007/0100632 | A1 * | 5/2007 | Aubauer | 704/275 |
| 2008/0183470 | A1 * | 7/2008 | Caskey et al. | 704/252 |
| 2009/0204407 | A1 * | 8/2009 | Shields et al. | 704/270.1 |
| 2009/0326938 | A1 * | 12/2009 | Marila et al. | 704/235 |

* cited by examiner

*Primary Examiner* — Edgar Guerra-Erazo

(57) ABSTRACT

A device provides a question to a user, and receives, from the user, an unrecognized voice response to the question. The device also provides the unrecognized voice response to an utterance agent for determination of the unrecognized voice response without user involvement, and provides an additional question to the user prior to receiving the determination of the unrecognized voice response from the utterance agent.

23 Claims, 10 Drawing Sheets

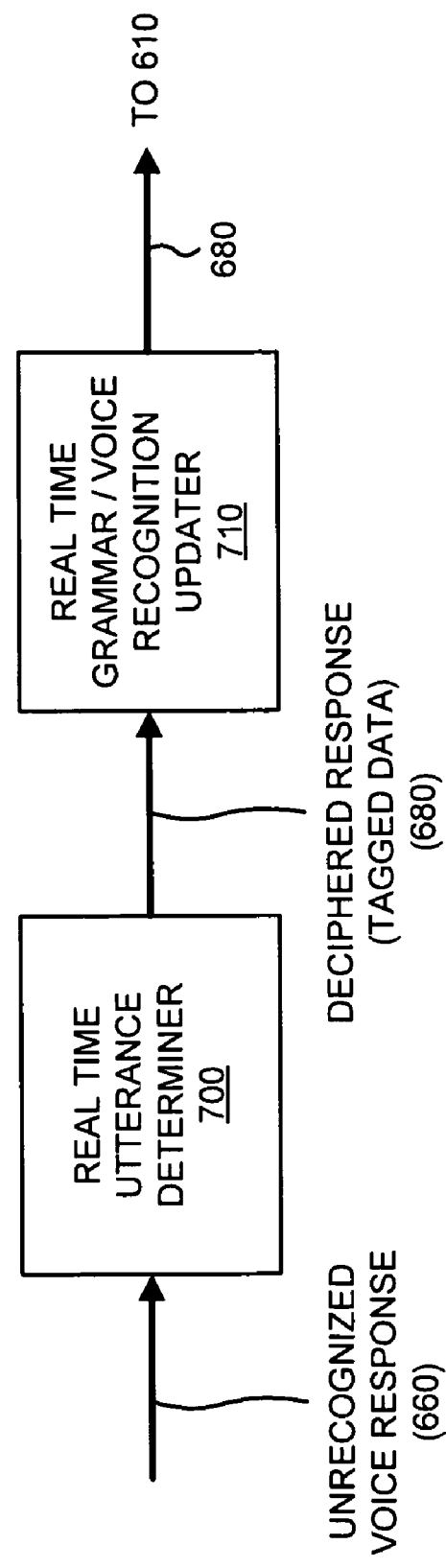

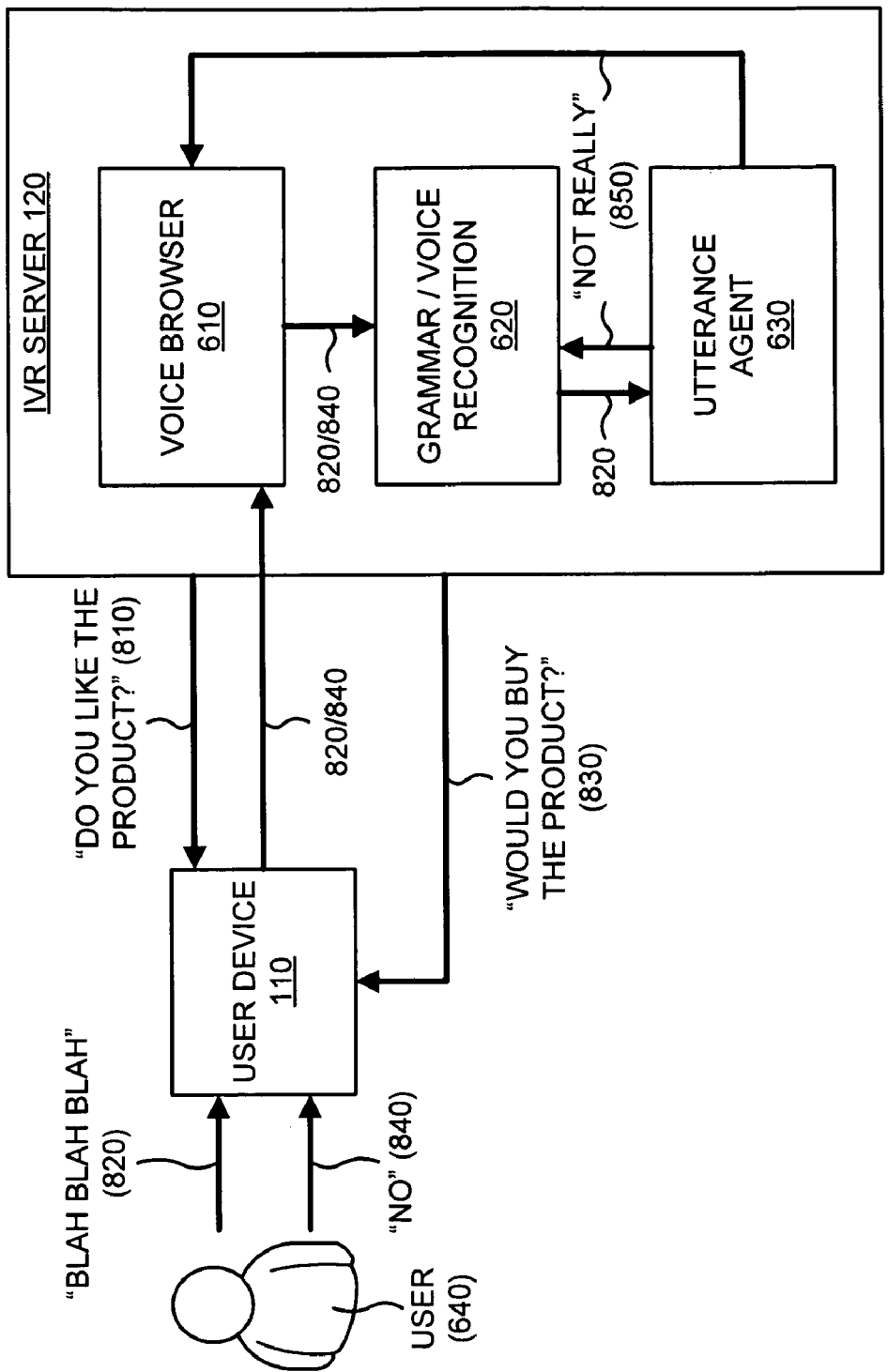

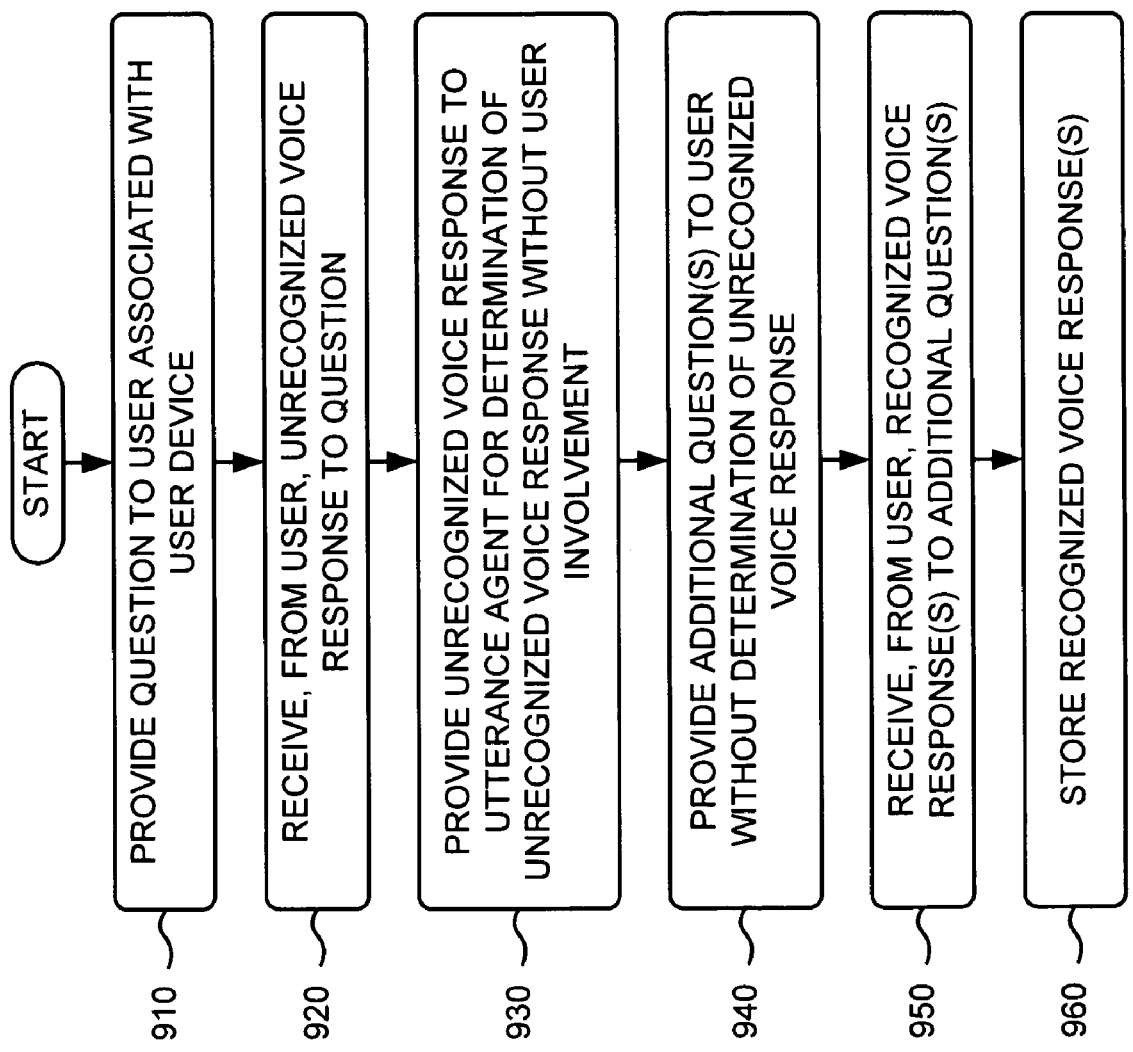

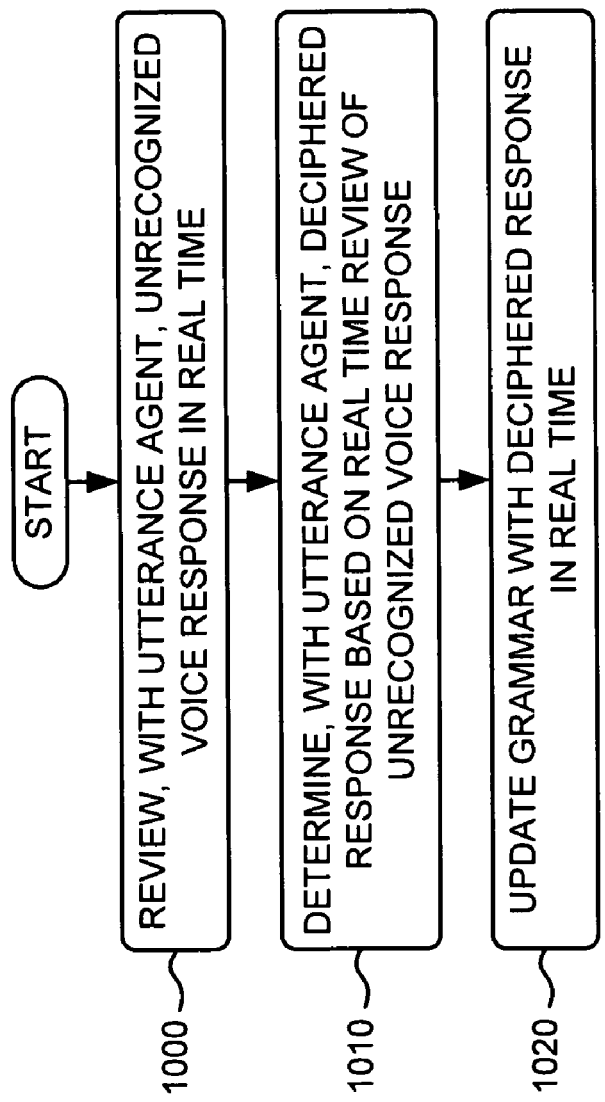

DYNAMIC UPDATE OF GRAMMAR FOR INTERACTIVE VOICE RESPONSE

BACKGROUND

Voice or speech recognition systems (e.g., an interactive voice response (IVR) system) may be used for a variety applications, such as voice dialing (e.g., "call home"), call routing (e.g., "I would like to make a collect call"), data entry (e.g., entering a credit card number), preparation of structured documents (e.g., a report), content-based spoken audio search (e.g., find a song when particular words were spoken), customer service (e.g., helping a customer to resolve a problem, find a product or service, etc.), etc. IVR generally refers to a computerized system (e.g., a voice recognition system) that allows a user, typically a telephone caller, to select an option from a voice menu or otherwise interface with a computer system. The system plays pre-recorded voice prompts to which the user responds by either pressing a number on a telephone keypad or by speaking to the system. However, user inputs (e.g., spoken words or voice recognition entries) to a voice recognition system may not be recognized (e.g., may be indecipherable), which may cause the voice recognition system to be inefficient and inaccurate.

BRIEF DESCRIPTION OF THE DRAWINGS

FIG. 7 depicts a diagram of exemplary functional components of an utterance agent component of the IVR server illustrated in FIG. 1;

FIG. 8 illustrates a diagram of a dynamic grammar update example capable of being performed by an exemplary portion of the network depicted in FIG. 1; and FIGS. 9 and 10 depict a flow chart of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable an interactive voice response (IVR) system to decipher an unrecognized voice response (e.g., an utterance) in real time, without interrupting an IVR session with a user, and to dynamically update grammar associated with the IVR system with the deciphered voice response. In one implementation, for example, the systems and/or methods may provide a question to a user associated with a user device, and may receive an unrecognized voice response from the user. The systems and/or methods may provide the unrecognized voice response to an utterance agent for determination of the unrecognized voice response (e.g., in real time), without involvement of the user. The utterance agent may review the unrecognized voice response in real time, may determine a deciphered response based on the real time review of the unrecognized voice response, and may update grammar (e.g., associated with the IVR system) with the deciphered response in real time.

As used herein, the term "user" is intended to be broadly interpreted to include a user device or a user of a user device.

"Grammar," as the term is used herein, is to be broadly construed to include any oral, verbal, audible, etc. response (e.g., one or more words) capable of being provided by a user to a voice recognition application and/or recognized by the voice recognition application. Grammar may also be construed to include one or more rules used by the voice recognition application.

Figure 1:
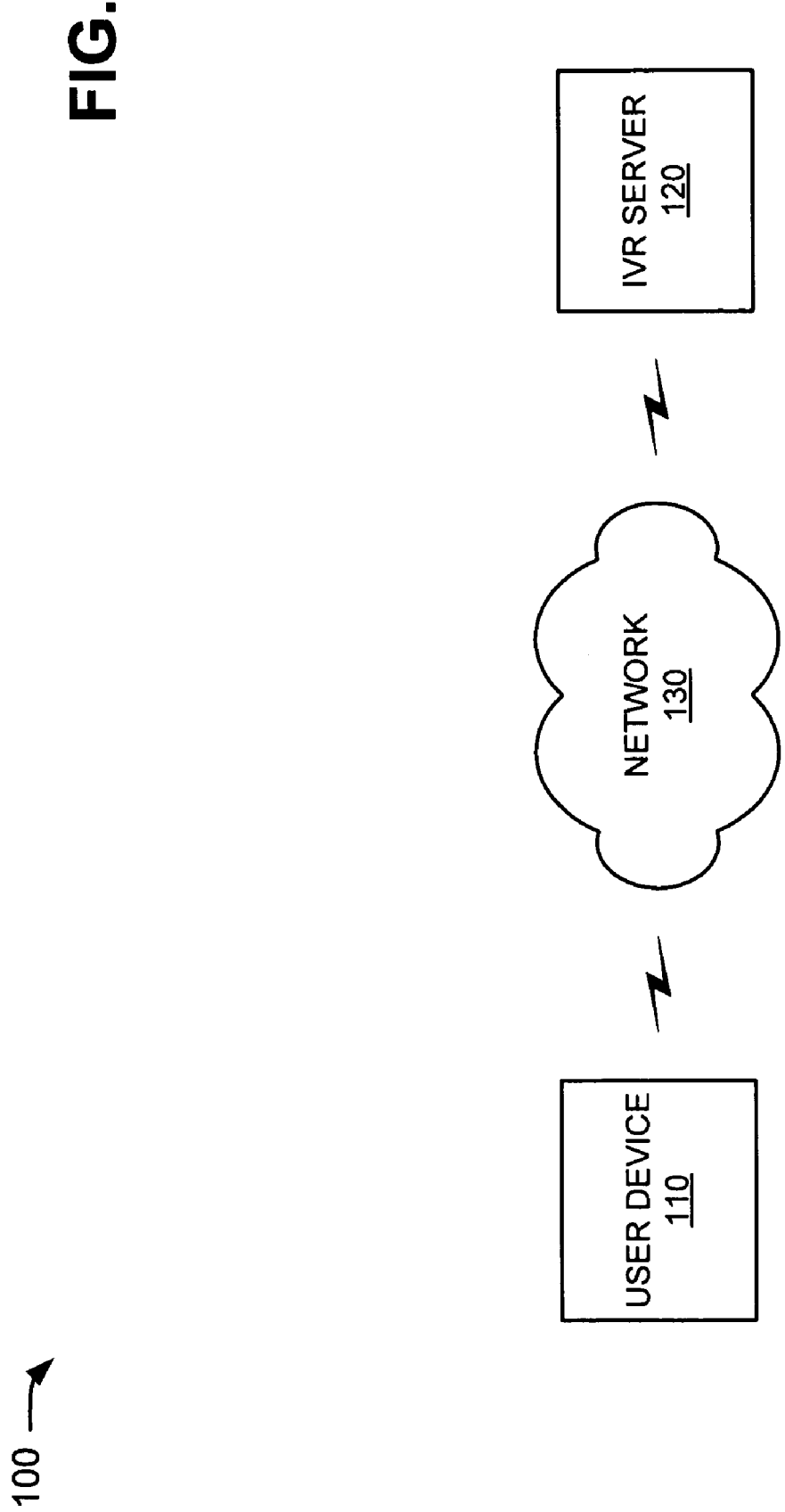
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 110 and an interactive voice response (IVR) server 120 interconnected by a network 130. Components of network 100 may interconnect via wired and/or wireless connections. A single user device 110, IVR server 120, and network 130 have been illustrated in FIG. 1 for simplicity. In practice, there may be more user devices 110, IVR servers 120, and/or networks 130. Also, in some instances, one or more of the components of network 100 may perform one or more functions described as being performed by another one or more of the components of network 100.

User device 110 may include any device that is capable of accessing IVR server 120 via network 130. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a set-top box (STB), a television, a personal gaming system, or other types of computation or communication devices, threads or processes running on these devices, and/or objects executable by these devices. User device 110 may enable a user to interact with an IVR system (e.g., provided on user device 110 and/or on IVR server 120), and to provide voice responses to the IVR system. In one example, user device 110 may provide a recognized voice response or an unrecognized voice response (e.g., an utterance), received from the user, to the IVR system.

IVR server 120 may include one or more server entities, or other types of computation or communication devices, that gather, process, search, and/or provide information in a manner described herein. In one implementation, IVR server 120 may include a grammar component, a voice (or speech) recognition component, and/or an utterance agent component. The grammar component of IVR server 120 may acquire statistical information (e.g., from the voice recognition component) associated with voice recognition events, such as current grammar trends, grammar usage patterns, seasonal grammar information, etc., associated with user voice inputs (e.g., voice recognition events). The grammar component may use the statistical information to automatically adjust grammar usages and/or weightings of individual grammar entries to improve overall voice recognition performance (e.g., of the voice recognition component). The voice recognition component of IVR server 120 may include a voice or speech recognition application, such as an interactive voice response (IVR) application, a voice dialing application, a call routing application, a data entry application, a structured documents preparation application, a content-based spoken audio search application, etc. The utterance agent component of IVR server 120 may receive an unrecognized voice response (e.g., from the voice recognition component), may review the unrecognized voice response in real time, may determine a deciphered response based on the real time review of the unrecognized voice response, and may update the grammar component with the deciphered response in real time.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
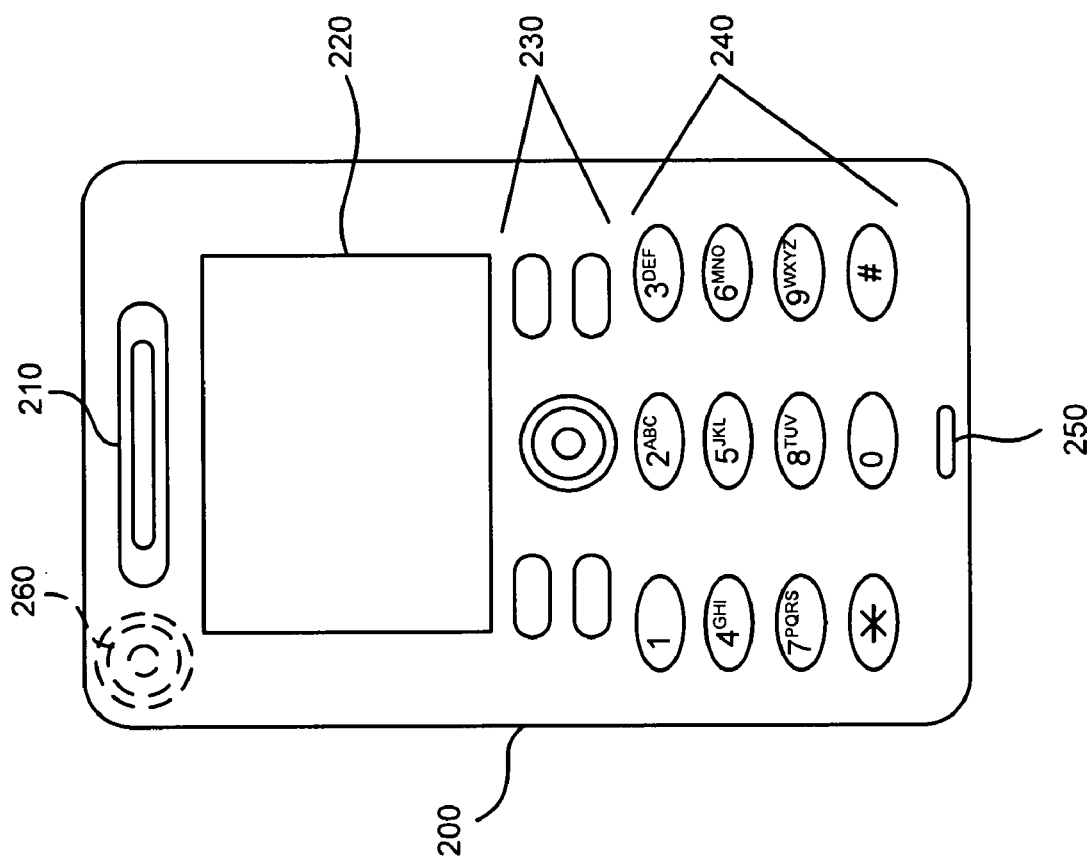
FIG. 2 illustrates a diagram of an exemplary user device of the network depicted in FIG. 1.

FIG. 2 depicts a diagram of exemplary external components of user device 110. As illustrated, user device 110 may include a housing 200, a speaker 210, a display 220, control buttons 230, a keypad 240, a microphone 250, and/or a camera 260. Housing 200 may protect the components of user device 110 from outside elements. Speaker 210 may provide audible information to a user of user device 110.

Display 220 may provide visual information to the user. For example, display 220 may display text input into user device 110, text, images, video, and/or graphics received from another device, and/or information regarding incoming or outgoing calls or text messages, emails, media, games, phone books, address books, the current time, etc. In one exemplary implementation, display 220 may act as a viewfinder that may aid user device 110 in capturing and/or storing video and/or images. Control buttons 230 may permit the user to interact with user device 110 to cause user device 110 to perform one or more operations. For example, control buttons 230 may be used to cause user device 110 to transmit information. Keypad 240 may include a standard telephone keypad. Microphone 250 may receive audible information from the user. Camera 260 may be provided on a back side of user device 110, and may enable user device 110 to capture and/or store video and/or images (e.g., pictures).

Although FIG. 2 shows exemplary external components of user device 110, in other implementations, user device 110 may contain fewer, different, or additional components than depicted in FIG. 2. In still other implementations, one or more components of user device 110 may perform one or more other tasks described as being performed by one or more other components of user device 110.

Figure 3:
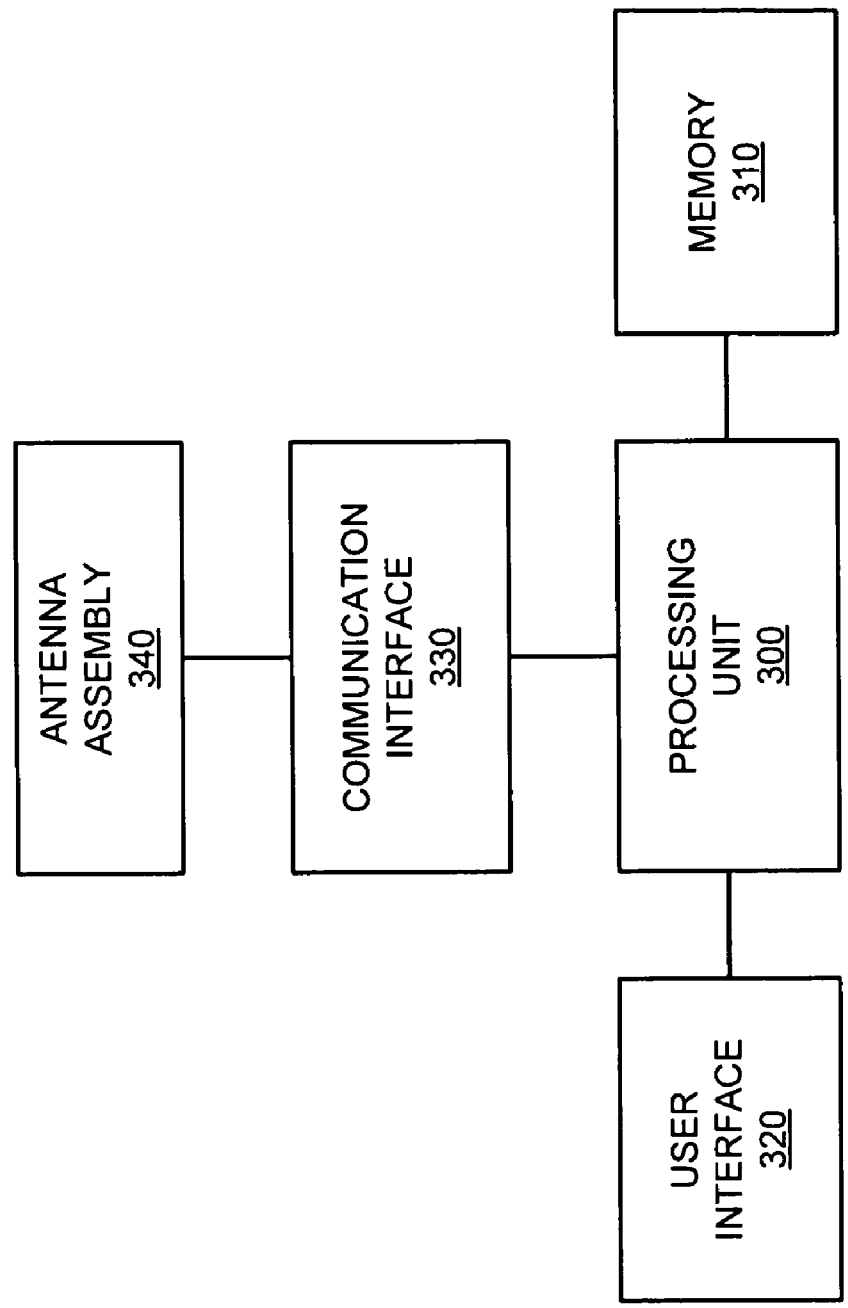
FIG. 3 depicts a diagram of exemplary components of the user device illustrated in FIG. 2.

FIG. 3 is a diagram of exemplary internal components of user device 110. As illustrated, user device 110 may include a processing unit 300, memory 310, a user interface 320, a communication interface 330, and/or an antenna assembly 340.

Processing unit 300 may include a processor, a microprocessor, an application specific integrated circuit (ASIC), a field programmable gate array (FPGA), or the like. Processing unit 300 may control operation of user device 110 and its components. In one implementation, processing unit 300 may control operation of components of user device 110 in a manner described herein.

Memory 310 may include a random access memory (RAM), a read-only memory (ROM), and/or another type of memory to store data and instructions that may be used by processing unit 300.

User interface 320 may include mechanisms for inputting information to user device 110 and/or for outputting information from user device 110. Examples of input and output mechanisms might include buttons (e.g., control buttons 230, keys of keypad 240, a joystick, etc.) or a touch screen interface to permit data and control commands to be input into user device 110; a speaker (e.g., speaker 210) to receive electrical signals and output audio signals; a microphone (e.g., microphone 250) to receive audio signals and output electrical signals; a display (e.g., display 220) to output visual information (e.g., text input into user device 110); a vibrator to cause user device 110 to vibrate; and/or a camera (e.g., camera 260) to receive video and/or images.

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network (e.g., network 130).

As described herein, user device 110 may perform certain operations described herein in response to processing unit 300 executing software instructions of an application contained in a computer-readable medium, such as memory 310. A computer-readable medium may be defined as a physical or logical memory device. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary internal components of user device 110, in other implementations, user device 110 may contain fewer, different, or additional components than depicted in FIG. 3. In still other implementations, one or more components of user device 110 may perform one or more other tasks described as being performed by one or more other components of user device 110.

Figure 4:
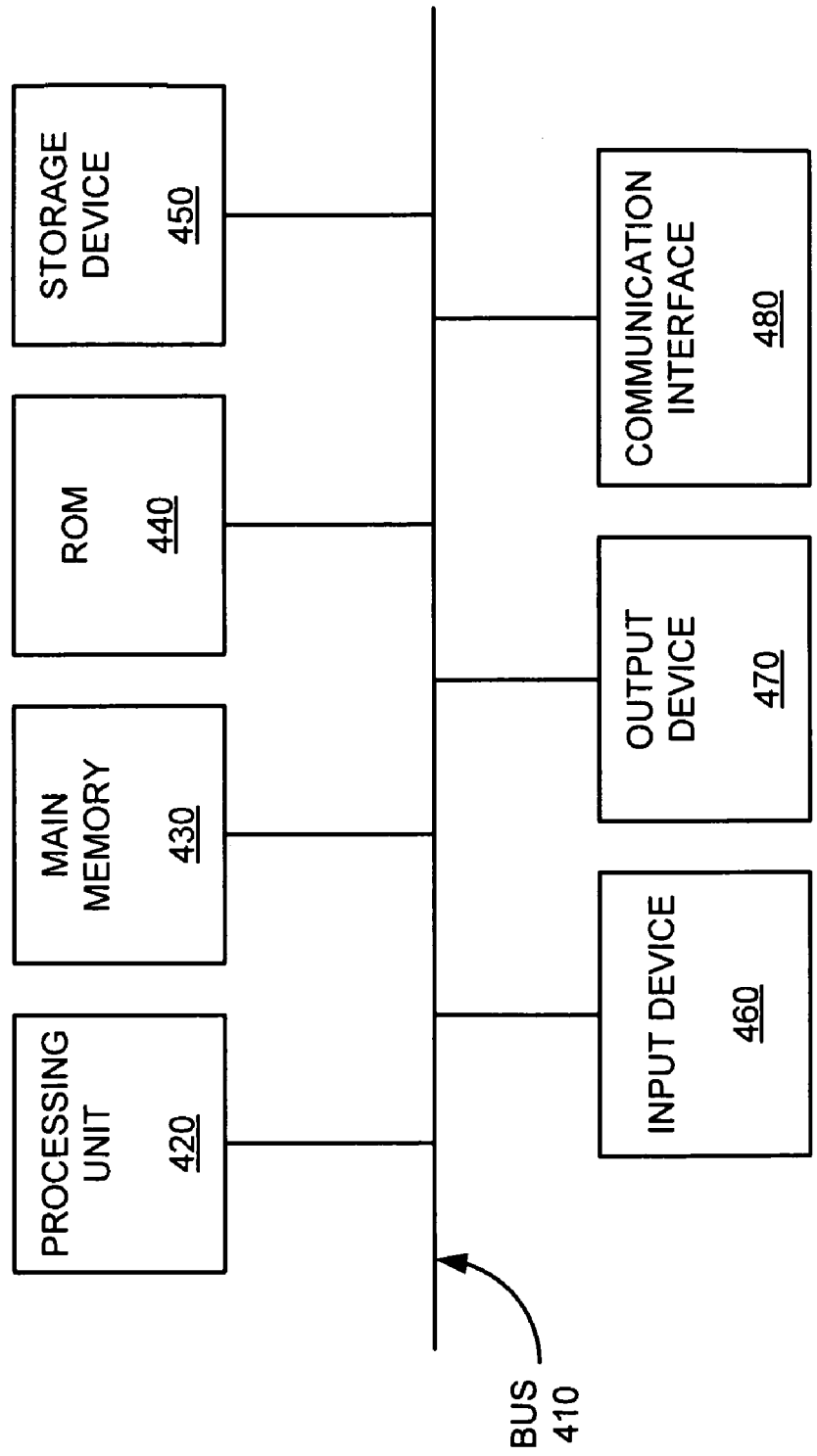
FIG. 4 illustrates a diagram of exemplary components of an interactive voice response (IVR) server of the network depicted in FIG. 1.

FIG. 4 is an exemplary diagram of a device 400 that may correspond to IVR server 120. As illustrated, device 400 may include a bus 410, a processing unit 420, a main memory 430, a read-only memory (ROM) 440, a storage device 450, an input device 460, an output device 470, and/or a communication interface 480. Bus 410 may include a path that permits communication among the components of device 400.

Processing unit 420 may include a processor, microprocessor, or other type of processing unit that may interpret and execute instructions. Main memory 430 may include a random access memory (RAM) or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to device 400, such as a keyboard, a mouse, a pen, a microphone, voice recognition and/or biometric mechanisms, a remote control, a touch screen, etc. Output device 470 may include a mechanism that outputs information to the operator, including a display, a printer, a speaker, etc. Communication interface 480 may include any transceiver-like mechanism that enables device 400 to communicate with other devices and/or systems. For example, communication interface 480 may include mechanisms for communicating with another device or system via a network, such as network 130.

As described herein, device 400 may perform certain operations in response to processing unit 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer, different, or additional components than depicted in FIG. 4. In still other implementations, one or more components of device 400 may perform one or more other tasks described as being performed by one or more other components of device 400.

Figure 5:
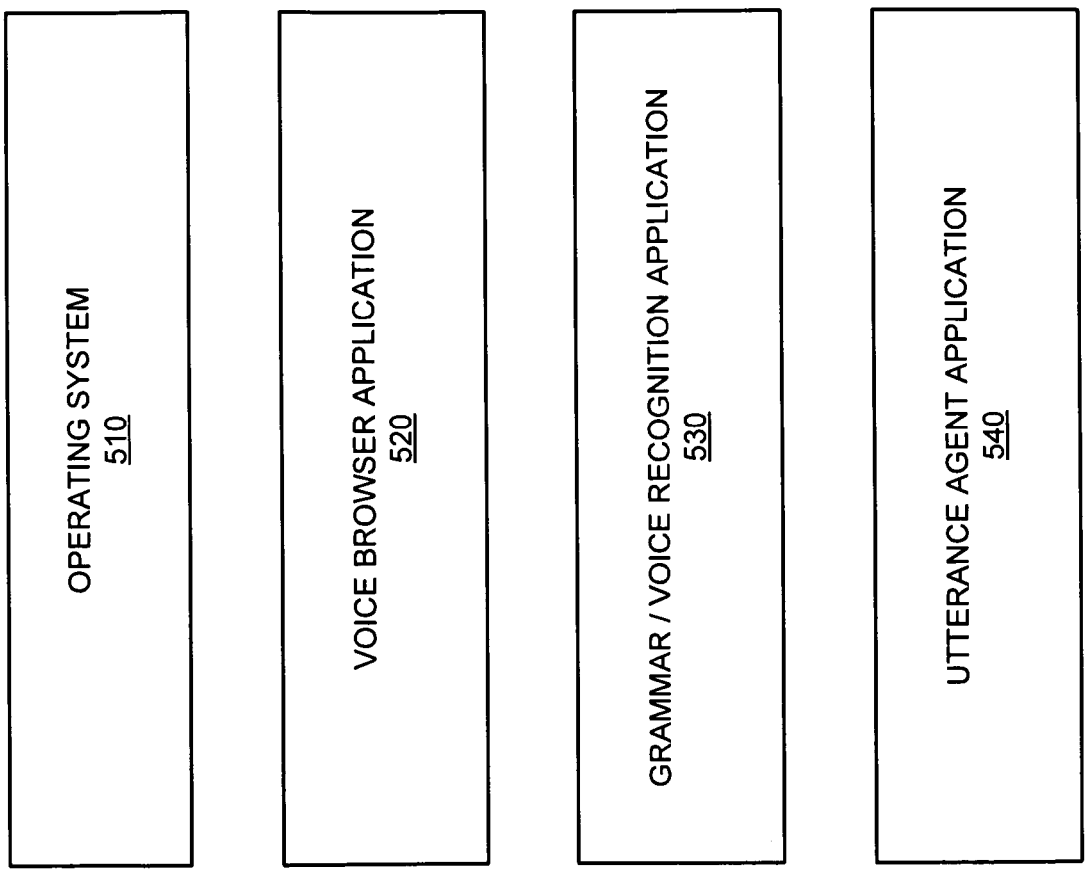
FIG. 5 depicts a diagram of a portion of an exemplary computer-readable medium that may be used by the user device and/or the IVR server illustrated in FIG. 1.

FIG. 5 depicts a diagram of a portion of an exemplary computer-readable medium 500 that may be used by user device 110 and/or IVR server 120. In one implementation, computer-readable medium 500 may correspond to memory 310 of user device 110. In other implementations, computer-readable medium 500 may correspond to main memory 430, ROM 440, and/or storage device 450 of device 400.

The portion of computer-readable medium 500 illustrated in FIG. 5 may include an operating system 510, a voice browser application 520, a grammar/voice recognition application 530, and an utterance agent application 540. Voice browser application 520, grammar/voice recognition application 530, and/or utterance agent application 540 may be included in operating system 510 or may be separate from operating system 510. One or more of voice browser application 520, grammar/voice recognition application 530, and/or utterance agent application 540 may be included in or may be separate from one or more of each other. For example, in one implementation, utterance agent application 540 may be a process separate from operating system 510 and/or grammar/voice recognition application 530. In this implementation, utterance agent application 540 may be provided on a device (e.g., user device 110) that is separate from a device (e.g., IVR server 120) that includes grammar/voice recognition application 530, but may interact with grammar/voice recognition application 530, e.g., via network 130.

Operating system 510 may include operating system software, such as the Microsoft Windows, Apple MAC OS, Linux, Unix, IBM OS/2, and/or other types of operating systems capable of use in server entities, user devices, or other types of computation or communication devices.

Voice browser application 520 may include an executable object or process. User device 110 and/or IVR server 120 may obtain the executable object or process from another device or from a disk, tape, network, CD-ROM, etc. Alternatively, the executable object or process may be pre-installed on user device 110 and/or IVR server 120. Voice browser application 520 may perform any of the functions described herein as being performed by voice browser component of IVR server 120. Voice browser application 520 may be automatically activated upon initiation of operating system 510. Alternatively, voice browser application 520 may be activated when instructed by a user. In either case, voice browser application 520 may receive recognized and/or unrecognized voice responses (e.g., from a user of user device 110), may record the voice responses in real time, and may provide the recorded voice responses to grammar/voice recognition application 530, as described herein.

Grammar/voice recognition application 530 may include an executable object or process. User device 110 and/or IVR server 120 may obtain the executable object or process from another device or from a disk, tape, network, CD-ROM, etc. Alternatively, the executable object or process may be pre-installed on user device 110 and/or IVR server 120. Grammar/voice recognition application 530 may perform any of the functions described herein as being performed by a grammar component and/or a voice recognition component of IVR server 120. Grammar/voice recognition application 530 may be automatically activated upon initiation of operating system 510. Alternatively, grammar/voice recognition application 530 may be activated when instructed by a user. In either case, grammar/voice recognition application 530 may acquire and use statistical information associated with voice recognition events to automatically adjust grammar usages and/or weightings of individual grammar entries to improve overall voice recognition performance, as described herein. Grammar/voice recognition application 530 may also perform voice or speech recognition functions, such as IVR functions, voice dialing functions, call routing functions, data entry functions, structured documents preparation functions, content-based spoken audio search functions, etc., as described herein.

Utterance agent application 540 may include an executable object or process. User device 110 and/or IVR server 120 may obtain the executable object or process from another device or from a disk, tape, network, CD-ROM, etc. Alternatively, the executable object or process may be pre-installed on user device 110 and/or IVR server 120. Utterance agent application 540 may perform any of the functions described herein as being performed by an utterance agent component of IVR server 120. Utterance agent application 540 may be automatically activated upon initiation of operating system 510. Alternatively, utterance agent application 540 may be activated when instructed by a user. In either case, utterance agent application 540 may receive an unrecognized voice response (e.g., from grammar/voice recognition application 530), may review the unrecognized voice response in real time, may determine a deciphered response based on the real time review of the unrecognized voice response, and may update grammar/voice recognition application 530 with the deciphered response in real time, as described herein.

Figure 6:
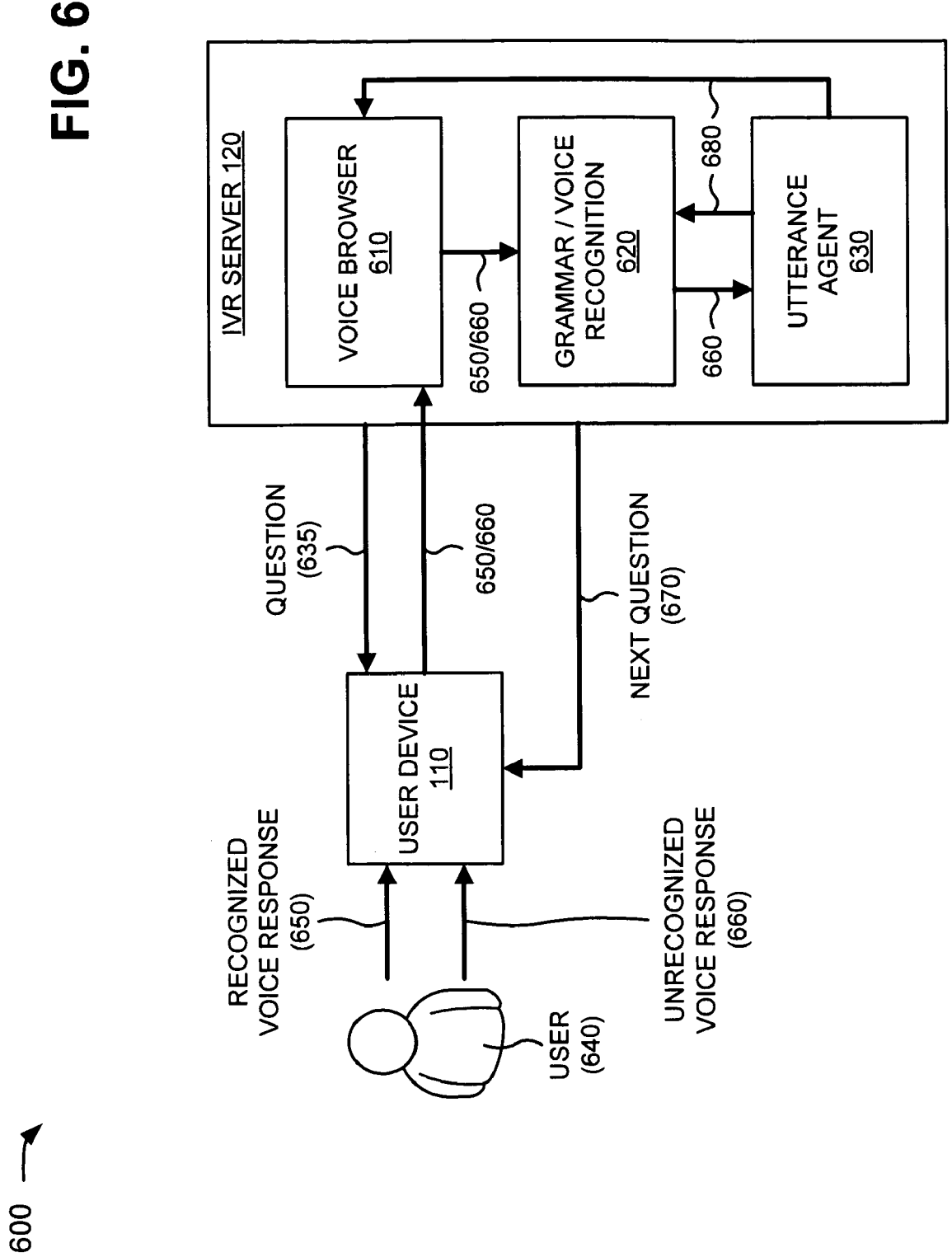
FIG. 6 illustrates a diagram of an exemplary dynamic grammar update operation capable of being performed by an exemplary portion of the network depicted in FIG. 1.

FIG. 6 illustrates a diagram of an exemplary dynamic grammar update operation capable of being performed by an exemplary portion 600 of network 100. As illustrated, exemplary network portion 600 may include user device 110 and IVR server 120. User device 110 and IVR server 120 may include the features described above in connection with, for example, FIG. 1. As further shown in FIG. 6, IVR server 120 may include a voice browser component 610, a grammar/voice recognition component 620, and an utterance agent component 630.

Voice browser component 610 may include any hardware, software, or combination of hardware and software that may that may receive and record any oral, verbal, audible, etc. voice response (e.g., one or more words) capable of being provided by a user to IVR server 120. In one implementation, voice browser component 610 may receive recognized and/or unrecognized voice responses (e.g., from a user of user device 110), may record the voice responses in real time, and may provide the recorded voice responses to grammar/voice recognition component 620. In one example, voice browser component 610 may perform the aforementioned functions via execution of instructions associated with voice browser application 520.

In one implementation, grammar/voice recognition component 620 may include any hardware, software, or combination of hardware and software that may acquire statistical information associated with voice recognition events, such as current grammar trends, grammar usage patterns, seasonal grammar information, etc., associated with user voice inputs (e.g., voice recognition events). Grammar/voice recognition component 620 may use the statistical information to automatically adjust grammar usages and/or weightings of individual grammar entries to improve overall voice recognition performance (e.g., of the voice recognition component).

In other implementations, grammar/voice recognition component 620 may convert recorded voice responses (e.g., received from voice browser component 610) to machine-readable inputs (e.g., to key presses, using a binary code for a string of character codes). Grammar/voice recognition component 620 may include a voice or speech recognition application, such as an IVR application, a voice dialing application, a call routing application, a data entry application, a structured documents preparation application, a content-based spoken audio search application, etc. In one exemplary implementation, grammar/voice recognition component 620 may use modeling to decipher voice responses. For example, grammar/voice recognition component 620 may utilize hidden Markov models (HMMs) (e.g., statistical models that output a sequence of symbols or quantities), cepstral normalization to normalize for different speaker and recording conditions, vocal tract length normalization (VTLN) for male-female normalization, maximum likelihood linear regression (MLLR) for more general speaker adaptation, heteroscedastic linear discriminant analysis (HLDA), etc. In one example, grammar/voice recognition component 620 may perform the aforementioned functions via execution of instructions associated with grammar/voice recognition application 530.

Utterance agent component 630 may include any hardware, software, or combination of hardware and software that may receive an unrecognized voice response (e.g., from grammar/voice recognition component 620), may review the unrecognized voice response in real time, may determine a deciphered response based on the real time review of the unrecognized voice response, and may update grammar/voice recognition component 620 with the deciphered response in real time. In one example, utterance agent component 630 may perform the aforementioned functions via execution of instructions associated with utterance agent application 540.

As further shown in FIG. 6, IVR system 120 may provide a question (or query) 635 (e.g., "What department are you looking for?") to a user 640 associated with user device 110. User 640 may respond to question 635 with a recognized voice response 650 or an unrecognized voice response 660. Recognized voice response 650 may include an audible response that may be interpreted by grammar/voice recognition component 620 of IVR system 120. For example, recognized voice response 650 may include a term (e.g., "Hello") stored by grammar/voice recognition component 620. Unrecognized voice response 660 may include an audible response (e.g., an utterance) that may not be interpreted by grammar/voice recognition component 620. For example, unrecognized voice response 660 may include a term (e.g., "Bloogeeeeley") that is not stored by grammar/voice recognition component 620.

User device 110 may provide recognized voice response 650 or unrecognized voice response 660 (e.g., whichever is received from user 640) to voice browser component 610. Voice browser component 610 may receive recognized voice response 650 and/or unrecognized voice response 660, may record voice responses 650/660 in real time, and may provide the recorded voice responses 650/660 to grammar/voice recognition component 620. For example, if grammar/voice recognition component 620 receives recognized voice response 650, grammar/voice recognition component 620 may decipher recognized voice response 650, may convert recognized voice response 650 to machine-readable inputs, and may store recognized voice response 650. IVR server 120 may generate a next question (or query) 670 (e.g., "What person are you looking for?") that may (or may not) be based on the deciphered recognized voice response 650. User 640 may respond to next question 670 with one or more recognized voice responses, and user device 110 may provide the recognized voice response(s) to grammar/voice recognition component 620, via voice browser component 610. Grammar/voice recognition component 620 may decipher the recognized voice response(s), may convert the recognized voice response(s) to machine-readable inputs, and may store the recognized voice response(s).

If grammar/voice recognition component 620 receives unrecognized voice response 660, grammar/voice recognition component 620 may attempt to decipher unrecognized voice response 660, may fail to decipher unrecognized voice response 660, and may provide unrecognized voice response 660 to utterance agent component 630. IVR system 120 may generate next question 670 (e.g., "What store are you looking for?") even though grammar/voice recognition component 620 was unable to decipher unrecognized voice response 660. Utterance agent component 630 may receive unrecognized voice response 660 and may review (e.g., listen to) unrecognized voice response 660 in real time. Utterance agent component 630 may determine a deciphered response 680 based on the real time review of unrecognized voice response 660 and may update voice browser component 610 and grammar/voice recognition component 620 with deciphered response 680 in real time. In one implementation, deciphering unrecognized voice response 660 may be transparent to user 640 since IVR server 120 may continue providing questions to user device 110 while utterance agent 620 deciphers unrecognized voice response 660.

Although FIG. 6 shows exemplary components of network portion 600, in other implementations, network portion 600 may contain fewer, different, or additional components than depicted in FIG. 6. In still other implementations, one or more components of network portion 600 may perform one or more other tasks described as being performed by one or more other components of network portion 600.

For example, although FIG. 6 shows voice recognition component 610, grammar/voice recognizer component 620, and utterance agent component 630 as being a part of IVR server 120, in other implementations, features of IVR server 120 (e.g., including voice recognition component 610, grammar/voice recognizer component 620, and/or utterance agent component 630) may be incorporated solely within user device 110. In such an arrangement, user device 110 may interact directly with user 640 (e.g., without involvement of IVR server 120), may decipher an unrecognized voice response (e.g., an utterance) in real time, without interrupting an IVR session with user 640, and may dynamically update g voice recognition component 610 and grammar/voice recognizer component 620 with the deciphered voice response.

FIG. 7 depicts a diagram of exemplary functional components of utterance agent component 630. As illustrated, utterance agent component 630 may include a real time determiner 700 and a real time grammar/voice recognition updater 710.

Real time utterance determiner 700 may include any hardware, software, or combination of hardware and software that may receive unrecognized voice response 660 from grammar/voice recognition component 620, and may decipher unrecognized voice response 660 in real time. In one implementation, real time utterance determiner 700 may listen to unrecognized voice response 660 in real time, and may use modeling to decipher unrecognized voice response 660. For example, real time utterance determiner 700 may utilize hidden Markov models (HMMs) (e.g., statistical models that output a sequence of symbols or quantities), cepstral normalization to normalize for different speaker and recording conditions, vocal tract length normalization (VTLN) for male-female normalization, maximum likelihood linear regression (MLLR) for more general speaker adaptation, heteroscedastic linear discriminant analysis (HLDA), etc. Real time utterance determiner 700 may provide deciphered response 680 (e.g., which may also be referred to as "tagged data") to real time grammar/voice recognition updater 710.

Real time grammar/voice recognition updater 710 may include any hardware, software, or combination of hardware and software that may receive deciphered response 680 from real time utterance determiner 700, and may provide deciphered response 680 to grammar/voice recognition component 620 in real time. Such an arrangement may enable utterance agent component 630 to dynamically update grammar/voice recognition component 620, and improve grammar so that next time grammar/voice recognition component 620 may recognize unrecognized voice response 660.

Although FIG. 7 shows exemplary functional components of utterance agent component 630, in other implementations, utterance agent component 630 may contain fewer, different, or additional functional components than depicted in FIG. 7. In still other implementations, one or more functional components of utterance agent component 630 may perform one or more other tasks described as being performed by one or more other functional components of utterance agent component 630.

FIG. 8 illustrates a diagram of a dynamic grammar update example capable of being performed by an exemplary portion 800 of network 100. As illustrated, exemplary network portion 800 may include user device 110 and IVR server 120. User device 110 and IVR server 120 may include the features described above in connection with, for example, FIG. 1. As further shown in FIG. 8, IVR server 120 may include voice browser component 610, grammar/voice recognition component 620, and utterance agent component 630. Voice browser component 610, grammar/voice recognition component 620, and utterance agent component 630 may include the features described above in connection with, for example, FIGS. 6 and 7.

As further shown in FIG. 8, IVR system 120 may provide a question 810 (e.g., "Do you like the product?") to user 640. User 640 may respond to question 810, for example, with an unrecognized voice response 820 (e.g., "Blah blah blah"). Unrecognized voice response 820 may include an audible response (e.g., an utterance) that may not be interpreted by grammar/voice recognition component 620.

User device 110 may provide unrecognized voice response 820 to voice browser component 610, and voice browser component 610 may record unrecognized voice response 820. Voice browser component 610 may provided the recorded unrecognized voice response 820 to grammar/voice recognition component 620. Grammar/voice recognition component 620 may receive unrecognized voice response 820, may not decipher unrecognized voice response 820, and may provide unrecognized voice response 820 to utterance agent component 630. IVR system 120 may generate a next question 830 (e.g., "Would you buy the product?") even though grammar/voice recognition component 620 was unable to decipher unrecognized voice response 820. User 640 may respond to next question 820, for example, with a recognized voice response 840 (e.g., "No"). Recognized voice response 840 may include a term (e.g., "No") stored by grammar/voice recognition component 620.

Utterance agent component 630 may receive unrecognized voice response 820 and may review (e.g., listen to) unrecognized voice response 820 in real time. Utterance agent component 630 may determine a deciphered response 850 (e.g., "Not really") based on the real time review of unrecognized voice response 820 and may update voice browser component 610 and grammar/voice recognition component 620 with deciphered response 850 in real time. Grammar/voice recognition component 620 may store deciphered response 850. In one implementation, deciphering unrecognized voice response 820 may be transparent to user 640 since IVR server 120 may continue providing questions to user device 110 while utterance agent 620 deciphers unrecognized voice response 820.

Although FIG. 8 shows exemplary components of network portion 800, in other implementations, network portion 800 may contain fewer, different, or additional components than depicted in FIG. 8. In still other implementations, one or more components of network portion 800 may perform one or more other tasks described as being performed by one or more other components of network portion 800.

FIGS. 9 and 10 illustrate a flow chart of an exemplary process 900 for dynamically updating grammar associated with an interactive voice response (IVR) system according to implementations described herein. In one implementation, process 900 may be performed by IVR server 120. In another implementation, some or all of process 900 may be performed by another device (e.g., user device 110) or group of devices, including or excluding IVR server 120.

As illustrated in FIG. 9, process 900 may begin with providing a question to a user associated with a user device (block 910), and receiving, from the user, an unrecognized voice response to the question (block 920). For example, in implementations described above in connection with FIG. 6, IVR system 120 may provide question 635 (e.g., "What department are you looking for?") to user 640 associated with user device 110. User 640 may respond to question 635 with unrecognized voice response 660. Unrecognized voice response 660 may include an audible response (e.g., an utterance) that may not be interpreted by grammar/voice recognition component 620.

As further shown in FIG. 9, the unrecognized voice response may be provided to an utterance agent for determination of the unrecognized voice response without user involvement (block 930), and one or more additional questions may be provided to the user without the determination of the unrecognized voice response (block 940). For example, in implementations described above in connection with FIG. 6, if grammar/voice recognition component 620 receives unrecognized voice response 660, grammar/voice recognition component 620 may not decipher unrecognized voice response 660 and may provide unrecognized voice response 660 to utterance agent component 630. IVR system 120 may generate next question 670 (e.g., "What store are you looking for?") even though grammar/voice recognition component 620 was unable to decipher unrecognized voice response 660. Utterance agent component 630 may receive unrecognized voice response 660 and may decipher unrecognized voice response 660 in real time, without user involvement (e.g., without requesting clarification from user 640).

Returning to FIG. 9, one or more recognized voice responses to the one or more additional questions may be received from the user (block 950), and the one or more recognized voice responses may be stored (block 960). For example, in implementations described above in connection with FIG. 6, IVR server 120 may generate next question 670 (e.g., "What person are you looking for?") that may (or may not) be based on the deciphered recognized voice response 650. User 640 may respond to next question 670 with one or more recognized voice responses, and user device 110 may provide the recognized voice response(s) to grammar/voice recognition component 620, via voice browser component 610. Grammar/voice recognition component 620 may decipher the recognized voice response(s), may convert the recognized voice response(s) to machine-readable inputs, and may store the recognized voice response(s).

Process block 930 may include the process blocks depicted in FIG. 10. As shown in FIG. 10, process block 930 may include reviewing, with the utterance agent, the unrecognized voice response in real time (block 1000), determining, with the utterance agent, a deciphered response based on the real time review of the unrecognized voice response (block 1010), and updating grammar with the deciphered response in real time (block 1020). For example, in implementations described above in connection with FIG. 6, utterance agent component 630 may determine deciphered response 680 based on the real time review of unrecognized voice response 660 and may update voice browser component 610 and grammar/voice recognition component 620 with deciphered response 680 in real time. In one example, deciphering unrecognized voice response 660 may be transparent to user 640 since IVR server 120 may continue providing questions to user device 110 while utterance agent 620 deciphers unrecognized voice response 660.

Systems and/or methods described herein may enable an IVR system to decipher an unrecognized voice response in real time, without interrupting an IVR session with a user, and to dynamically update grammar associated with the IVR system with the deciphered voice response. In one implementation, for example, the systems and/or methods may provide a question to a user associated with a user device, and may receive an unrecognized voice response from the user. The systems and/or methods may provide the unrecognized voice response to an utterance agent for determination of the unrecognized voice response (e.g., in real time), without involvement of the user. The utterance agent may review the unrecognized voice response in real time, may determine a deciphered response based on the real time review of the unrecognized voice response, and may update grammar with the deciphered response in real time.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9 and 10, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A computing device-implemented method, comprising:
   providing a question to a user;
   receiving, from the user, an unrecognized voice response to the question;
   providing the unrecognized voice response to an utterance agent, associated with the computing device, for determination of the unrecognized voice response without user involvement, where the determination of the unrecognized voice response includes:
   reviewing, using the utterance agent and without user involvement, the unrecognized voice response to determine a deciphered response, and
   updating grammar, of a grammar/voice recognition component associated with the computing device, with the deciphered response without user involvement; and
   providing an additional question to the user during the determination of the unrecognized voice response by the utterance agent.

2. The computing device-implemented method of claim 1, further comprising:
   receiving, from the user, a recognized voice response to the additional question,
   where the recognized voice response is recognized using the grammar prior to the grammar being updated; and
   storing the recognized voice response.

3. The computing device-implemented method of claim 2, where the recognized voice response is decipherable by the grammar/voice recognition component associated with the computing device.

4. The computing device-implemented method of claim 1, where reviewing the unrecognized voice response comprises:

reviewing, with the utterance agent, the unrecognized voice response in real time; and determining, with the utterance agent, a deciphered response based on the real time review of the unrecognized voice response, and where updating the grammar comprises updating the grammar in real time.

5. The computing device-implemented method of claim 1, where the computing device comprises an interactive voice response (IVR) server, and where the IVR server includes the utterance agent.

6. The computing device-implemented method of claim 1, where the computing device comprises one or more of:
a radiotelephone,
a personal communications system (PCS) terminal,
a personal digital assistant (PDA),
a laptop computer,
a personal computer,
a set-top box (STB),
a television, or
a personal gaming system.

7. The computing device-implemented method of claim 1, further comprising:
determining that the unrecognized voice response includes an utterance that is indecipherable by a grammar/voice recognition component associated with the computing device,
where providing the unrecognized voice response to an utterance agent includes forwarding the unrecognized voice response to the utterance agent in response to determining that the unrecognized voice response includes an utterance that is indecipherable by the grammar/voice recognition component.

8. A computer-readable memory device comprising:
one or more instructions which, when executed by the processor of a device, cause the processor to provide a first query to a first user;
one or more instructions which, when executed by the processor, cause the processor to receive, from the first user, a voice response, to the first query;
one or more instructions which, when executed by the processor, cause the processor to determine that the voice response is not recognized by a grammar/voice recognition component of the device;
one or more instructions which, when executed by the processor, cause the processor to provide the voice response to an utterance agent component, of the device, for determination of the voice response without involvement of the first user;
one or more instructions which, when executed by the processor, cause the processor to review, by the utterance agent component, the voice response to determine a deciphered response without involvement of the first user;
one or more instructions which, when executed by the processor, cause the processor to update, with the deciphered response, grammar of the grammar/voice recognition component associated with the computing device without involvement of the first user;
one or more instructions which, when executed by the processor of a device, cause the processor to provide an additional query to the first user prior to receiving the determination of the unrecognized voice response from the utterance agent and
one or more instructions which, when executed by the processor, cause the processor to determine that a voice response, received from a second user, is recognized by the grammar/voice recognition component based on the updated grammar, where the voice response, received from a second user, corresponds to the voice response received from the first user.

9. The computer-readable memory device of claim 8, where the device includes an interactive voice response (IVR) server.

10. The computer-readable memory device of claim 8, where the device comprises one or more of:
a radiotelephone,
a personal communications system (PCS) terminal,
a personal digital assistant (PDA),
a laptop computer,
a personal computer,
a set-top box (STB),
a television, or
a personal gaming system.

11. The computer-readable memory device of claim 8, further comprising:
one or more instructions to provide an additional query to the first user while the grammar is being updated;
one or more instructions to receive, from the first user, a recognized voice response to the additional query; and
one or more instructions to store the recognized voice response in the computer-readable memory device.

12. The computer-readable memory device of claim 11, where the recognized voice response is decipherable by the grammar/voice recognition component.

13. The computer-readable memory device of claim 8, where the one or more instructions to review the voice response comprise:
one or more instructions to review the voice response in real time; and
one or more instructions to determine, with the utterance agent, a deciphered response based on the real time review of the voice response, and
where the one or more instructions to update the grammar comprise one or more instructions to update, in real time and with the deciphered response, the grammar.

14. The computer-readable memory device of claim 8, further comprising:
one or more instructions to determine that the voice response, received from the first user, includes a term that is not included in the grammar; and
one or more instructions to determine that the voice response, received from the first user, is indecipherable by the grammar/voice recognition component based on determining that the term is not included in the grammar,
where the one or more instructions to update the grammar include one or more instructions to update the grammar based on the term.

15. A device, comprising:
a memory to store a plurality of instructions; and
a processor to execute instructions in the memory to:
provide a question to a user,
receive, from the user, a voice response to the question,
determine, by a voice recognition component of the device, that the voice response includes one or more terms that are not included in the voice recognition component,
provide, without input from the user, the voice response to an utterance agent component, of the device, for determination of the voice response including the one or more terms based on determining that the voice response includes the one or more terms, review, using the utterance agent component, the voice response including the one or more terms to determine a deciphered response without input from the user, update, based on the deciphered response, the voice recognition component without input from the user, and provide an additional question to the user while the voice recognition component is being updated based on the deciphered response.

16. The device of claim 15, where the processor further executes instructions in the memory to:

receive, from the user, a recognized voice response to the additional question, and store the recognized voice response in the memory.

17. The device of claim 16, where the recognized voice response is decipherable by the voice recognition component associated with the device.

18. The device of claim 15, where, when reviewing the voice response, the processor is further to:

analyze the voice response in real time, determine the deciphered response based on the real time review of the response, and where, when updating the voice recognition component, the processor is further to update, in real time and based on the deciphered response, a grammar associated with the voice recognition component associated with the device.

19. The device of claim 15, where the device comprises an interactive voice response (IVR) server.

20. The device of claim 15, where the device comprises a user device.

21. The device of claim 20, where the user device comprises one or more of:

a radiotelephone,
a personal communications system (PCS) terminal,
a personal digital assistant (PDA),
a laptop computer,
a personal computer,
a set-top box (STB),
a television, or
a personal gaming system.

22. A system, comprising:

a grammar/voice recognition processor to:

receive, from a user and via a user device associated with the user, a voice response to a question provided to the user, attempt to decipher, based on grammar of the grammar/voice recognition component, the voice response, and provide the voice response to an utterance agent component when the attempt to decipher the voice response fails; and the utterance agent processor to:

review the voice response in real time without input from the user requesting review of the voice response, determine a deciphered response based on the real time review of the voice response and without input from the user requesting the utterance a determination of the deciphered response, and update, in real time, the grammar of the grammar/voice recognition component with the deciphered response without input from the user requesting an update of the grammar and while another question is being provided to the user.

23. The device of claim 22, where the voice response includes an utterance that is indecipherable by the grammar/voice recognition component.

* * * * *